United States Patent [19]

Nagai et al.

[11] Patent Number: 4,463,957
[45] Date of Patent: Aug. 7, 1984

[54] SEALING DEVICE FOR ROTARY SHAFT AND STRING-LIKE MEMBER FOR DEFINING SPIRAL THEREFOR

[75] Inventors: Yataro Nagai; Yoshiro Imai, both of Tokyo, Japan

[73] Assignee: Tanken Seiko Corp., Tokyo, Japan

[21] Appl. No.: 279,252

[22] Filed: Jul. 1, 1981

[30] Foreign Application Priority Data

Jul. 4, 1980 [JP] Japan .............................. 55-94346[U]
Jul. 4, 1980 [JP] Japan .............................. 55-94347[U]
Jul. 4, 1980 [JP] Japan .............................. 55-94348[U]
Jul. 4, 1980 [JP] Japan .............................. 55-94349[U]

[51] Int. Cl.³ .............................................. F16J 15/40
[52] U.S. Cl. .......................................... 277/34; 277/67
[58] Field of Search ................. 277/3, 27, 15, 67, 133, 277/134

[56] References Cited

U.S. PATENT DOCUMENTS 3,746,350  7/1973  Mayer et al. .......................... 277/134
3,843,140 10/1974  Mayer et al. .......................... 277/134

FOREIGN PATENT DOCUMENTS 53-40693   3/1978  Japan .
54-160632 11/1979  Japan .

Primary Examiner—Robert I. Smith
Attorney, Agent, or Firm—Frishauf, Holtz, Goodman and Woodward

[57] ABSTRACT

A sealing device for a rotary shaft is provided with a spiral member having a determined pitch and a determined thickness on a rotating portion and/or a stationary portion corresponding to the rotating portion. The spiral member may be provided via a shaft sleeve, or may be directly attached on a rotating portion and/or a stationary portion corresponding to the rotating portion. The spiral member may be in advance shaped in a spiral form, or may be a string-like flexible member which may be shaped in a spiral form.

26 Claims, 15 Drawing Figures

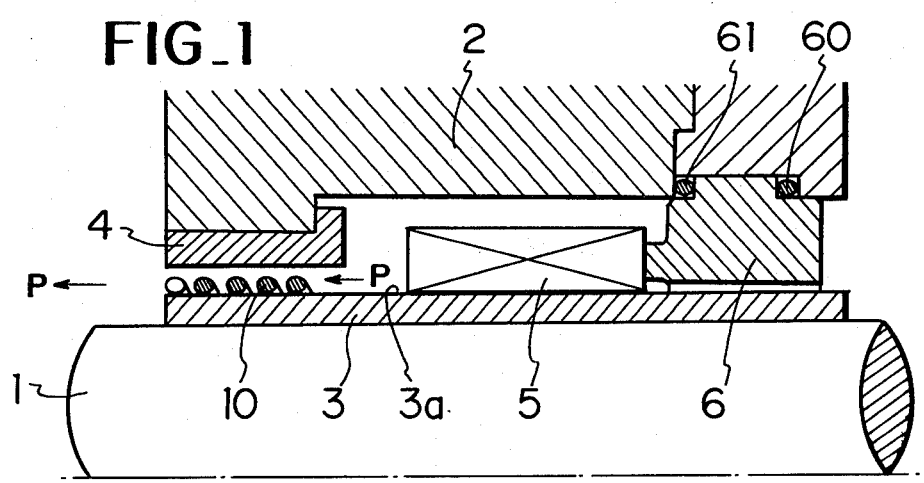
FIG_1
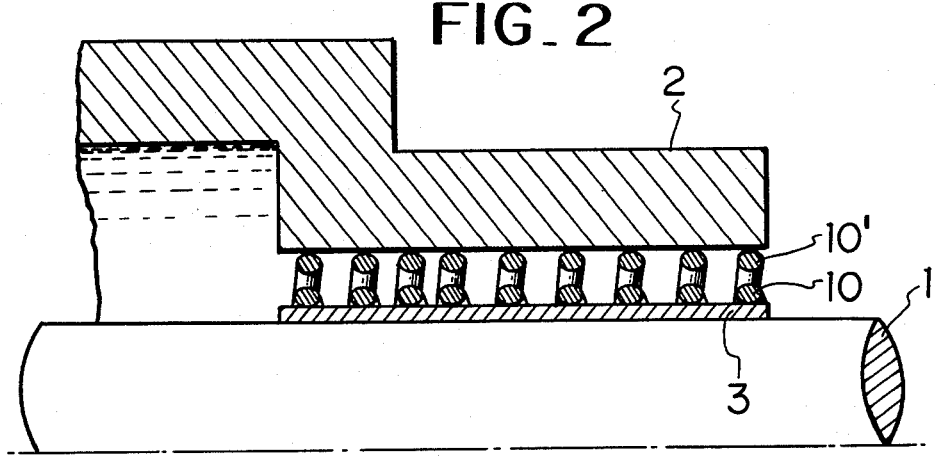
FIG_2
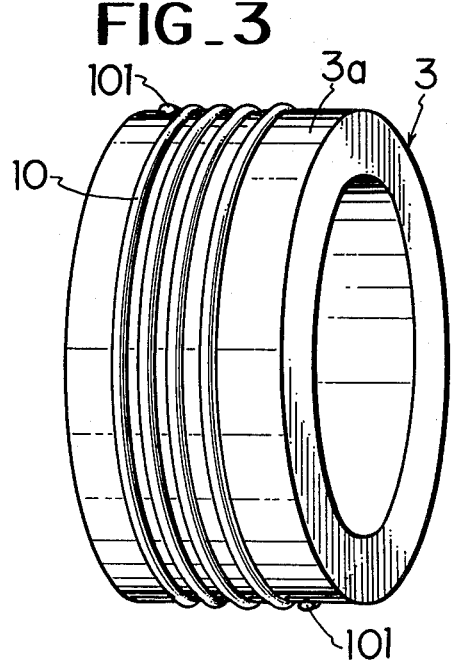
FIG_3
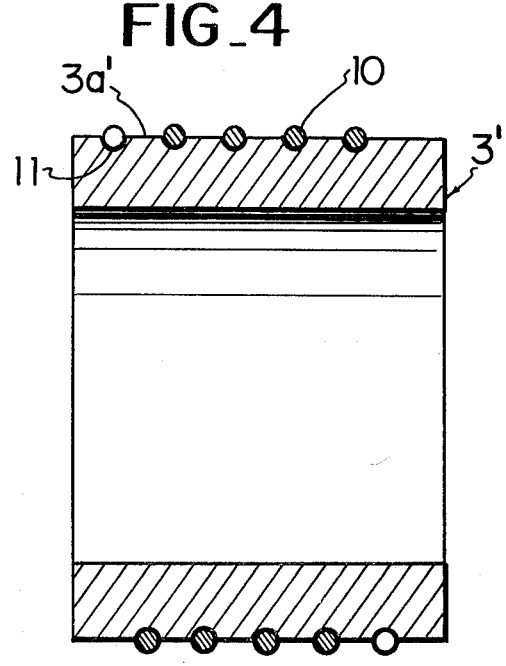
FIG_4

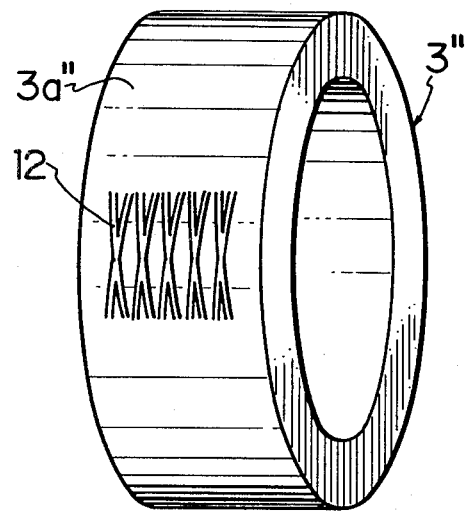
FIG_5
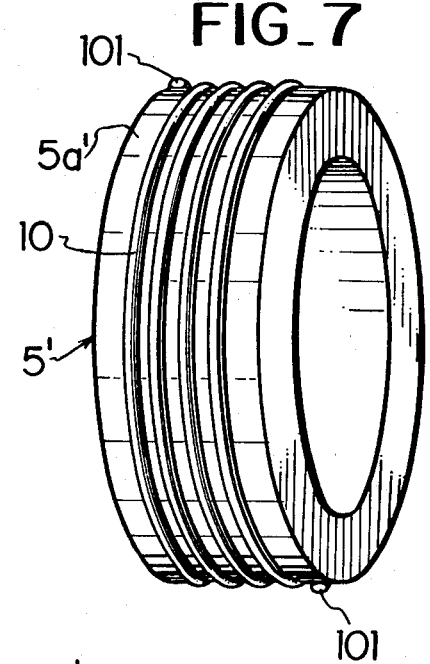
FIG_7
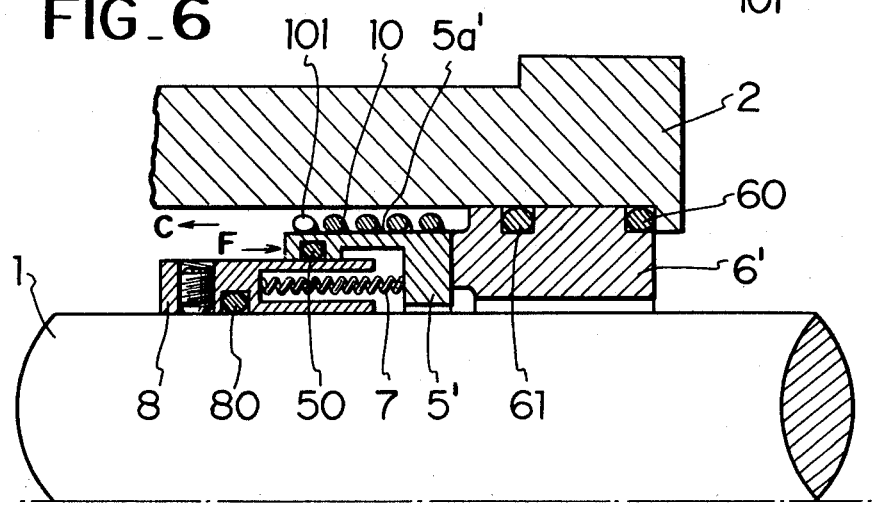
FIG_6
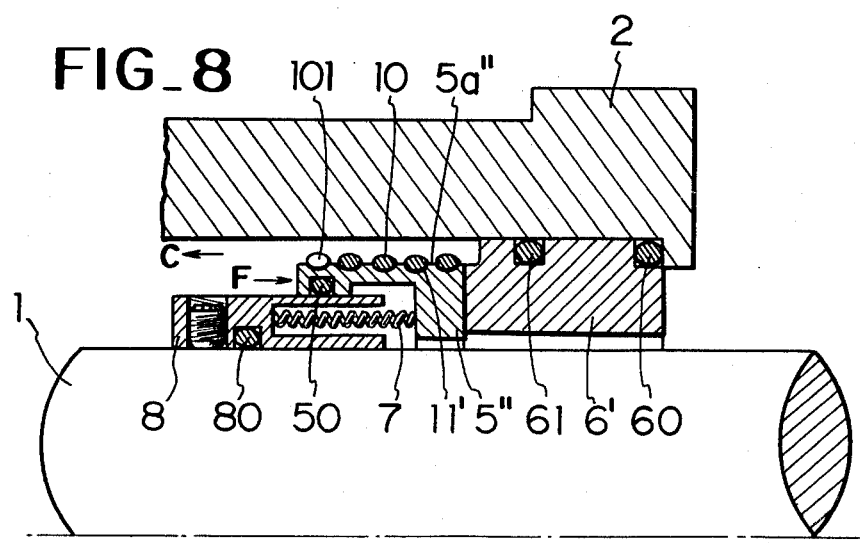
FIG_8

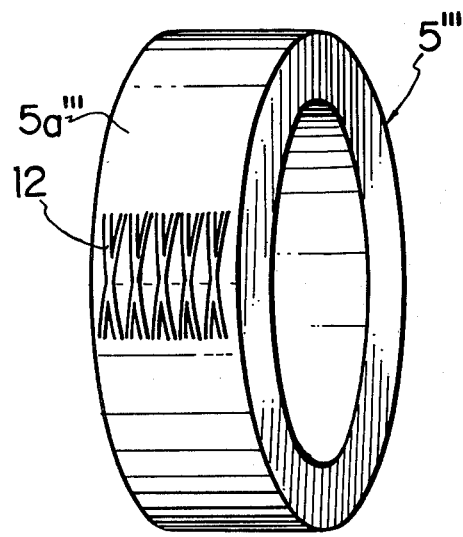
FIG_9
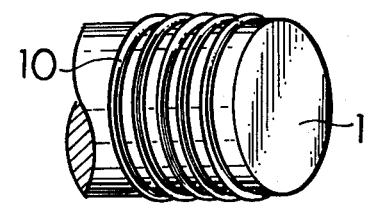
FIG_11
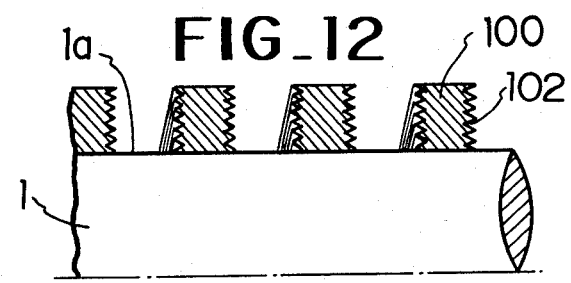
FIG_12
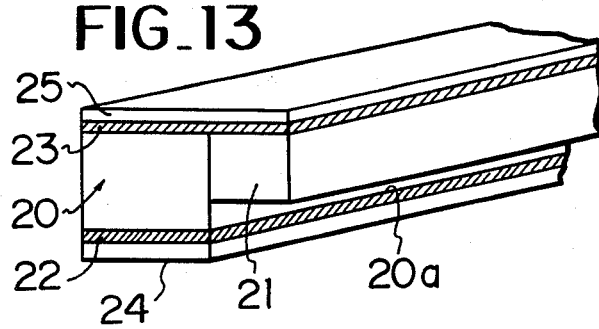
FIG_13
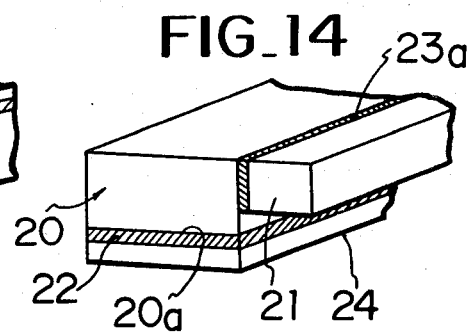
FIG_14
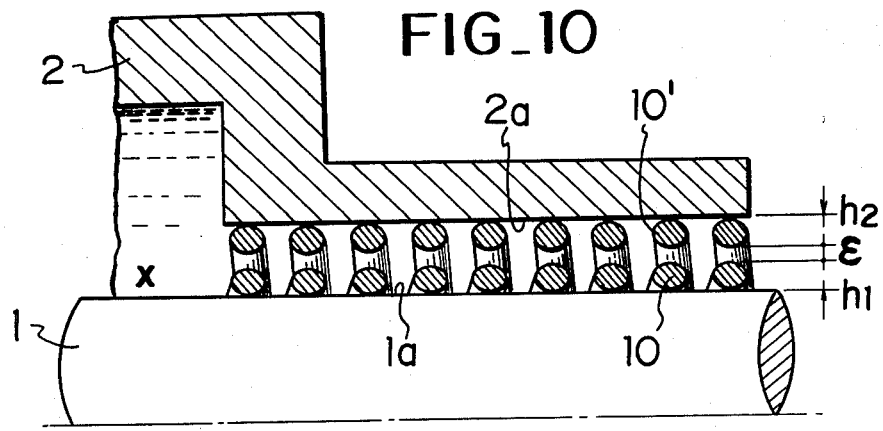
FIG_10
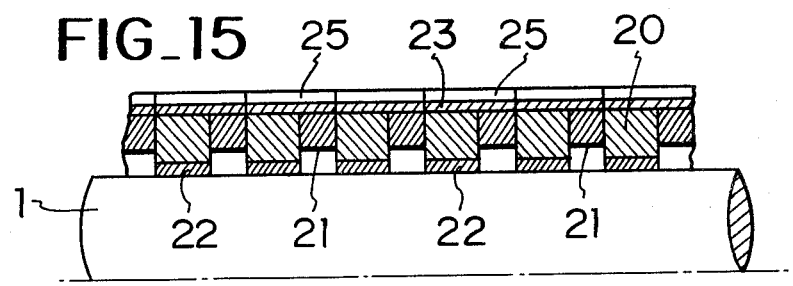
FIG_15

SEALING DEVICE FOR ROTARY SHAFT AND STRING-LIKE MEMBER FOR DEFINING SPIRAL THEREFOR

FIELD OF THE INVENTION

This invention relates to a sealing device for a rotary shaft installed in rotating machinery, and more particularly to a sealing device for a rotary shaft having a spiral member on a rotating portion and/or a stationary portion corresponding to the rotating portion, and relates to string member for defining the spiral member.

PRIOR ART

In a known sealing device for a rotary shaft, a spiral member is shaped on the rotary portion or the stationary portion corresponding thereto for providing an increase in the sealing function or slurry purging function.

For example, in regard to a mechanical seal, there have been proposed in Japanese Utility Model Applications No.40693/78 and No.160632/79 a seal in which a spiral portion is shaped on a rotating ring on its outer circumference in order to increase the sealing or the slurry purging. For a labyrinth seal, a screw shaped one is known wherein the spiral is shaped on an outer circumference of the rotary shaft, or between its circumference and an inner circumference of a casing in order to provide sealing pressure.

For forming the spiral in these shaft sealing devices, generally the machining is directly performed on the rotary ring, the rotary shaft or the casing.

However, this manner of machining has disadvantages such as lowering the strength of the blank piece by the machining, taking much time for defining the depth and the pitch in the spiral with high precision, and being difficult in repairing or exchanging the spiral.

OBJECTS OF THE INVENTION

A first object of the invention is to offer a seal for a rotary shaft, which may define a spiral having an optional depth and optional pitch with high precision and with ease.

A second object of the invention is to offer a rotary shaft seal which does not bring about lowering of the strength in the blank piece due to forming the spiral.

A third object of the invention is to offer a rotary shaft seal which is economical to fabricate without creating waste in the blank piece by forming the spiral.

A fourth object of the invention is to offer a rotary shaft seal in which is possible to repair or exchange the spiral portion.

A fifth object of the invention is to offer an elongated string-like material which is easily shaped into a spiral member with high precision.

SUMMARY OF THE INVENTION

In the rotary shaft seal according to the invention, a member of spiral shape is fixed for a spiral member to an appropriate rotating portion and/or an appropriate stationary portion corresponding to the rotary portion. The depth of the spiral shaped member depends upon the thickness of the spiral shaped member. The pitch of the spiral shaped member depends upon the pitch of the spiral shaped member. For increasing the precision in the depth and the pitch of the spiral portion, it is, therefore, necessary to increase the precision in the thickness and the pitch of the spiral member. This is far easier than directly applying the machining process to the rotating portion or the stationary portion. Depending upon the conventional machining process, it would not be possible to exchange the spiral shaped member and take it off, followed by repairing and again fitting it. Such exchanging and repairing can be provided in the present invention. Since the screwing direction of the spiral portion can be made only by changing the screwing direction of the spiral member. The rotating portion or the stationary portion may be common, irrespectively of the screwing direction.

The spiral member is fixed to the rotating portion or the stationary portion by welding, an adhesive agent or the like. It is sufficient that the rotating portion or the stationary portion are defined with shallow groove in the spiral or in "X" shape, into which the spiral member is fixedly mounted. The spiral member is fixed to the sleeve without directly providing the spiral member to the rotating portion, and this sleeve is mounted on the rotating portion.

For the spiral shaped portion, it is sufficient to apply a rigid material, which has been shaped in a spiral, to a destined portion, or apply a flexible string-like member in a spiral thereto.

When using the flexible string-like member, it is advisable to adopt a string member which is detachably provided with a spacer having a width corresponding to the pitch of a spiral to be prepared on the side of the string member.

BRIEF DESCRIPTION OF THE DRAWINGS

FIG. 1 is a partial cross sectional view of a mechanical seal provided with a shaft sleeve according to the invention, FIG. 2 is a partial cross sectional view of a screw shaped labyrinth seal provided with a shaft sleeve according to the invention, FIG. 3 is a perspective view of a shaft sleeve, FIG. 4 is a cross sectional view of a shaft sleeve provided with a groove, FIG. 5 is a perspective view of a shaft sleeve provided with "X" shaped grooves.

FIG. 6 is a partial cross sectional view of a mechanical seal provided with a spiral member on a rotary ring, FIG. 7 is a perspective view of a rotary shaft according to the invention, FIG. 8 is a partial cross sectional view of a mechanical seal formed with a groove on a rotary ring into which a spiral member is positioned, FIG. 9 is a perspective view of a rotary ring provided with "X" shaped grooves, FIG. 10 is a partial cross sectional view of a screw shaped labyrinth seal provided with spiral members, FIG. 11 is a perspective view of a rotary shaft provided with a spiral member, FIG. 12 is a perspective view of a rotary shaft provided with a spiral member of another shape in cross section, FIG. 13 is a perspective view showing one embodiment of a string member for forming a spiral, FIG. 14 is a perspective view showing another embodiment of string-like member for forming a spiral, and FIG. 15 is a cross sectional view of a rotary shaft showing the manner of applying a spiral forming string member to a rotary shaft.

DETAILED DESCRIPTION OF PREFERRED EMBODIMENTS OF THE INVENTION

FIG. 1 shows an embodiment wherein a spiral member 10 is fixed to a shaft sleeve 3 on its outer circumference, and those are mounted on a rotary shaft 1 installed in a mechanical seal for sealing liquid including slurry. Herein, the numeral 5 is a rotary ring, 6 is a stationary ring, 60 and 61 are O-rings, 4 is a neck bush, and 2 is a casing. In this embodiment, there is provided the spiral member 10 on a portion of the sleeve 3 corresponding to the neck bush 4, since the spiral member 10 has a large effect in a narrow part defined in a small space.

When the shaft 1 is rotated in such a structure, flow in the P direction is formed at the spiral member 10 so that the slurry is discharged without staying around the stationary ring 6 and the rotary ring 5, and the slurry purging function may be heightened.

FIG. 2 shows an embodiment wherein the shaft sleeve 3 is applied to a screw shaped rotary labyrinth seal. Herein, a spiral portion 101 on an inner circumference of the casing is also defined with the spiral member 10 on sleeve 3.

FIG. 3 is a perspective view showing a detail of the shaft sleeve 3 on an outer circumference 3a of which is mounted the spiral member 10 by fixing the spiral member 10 at its ends 101, 101 thereon. This fixing may be done by welding, an adhesive agent or the like. The spiral member 10 may be fixed not only at its end portions but also at a plurality of points, or over the whole length thereof. Further, this embodiment illustrates the spiral member circular in cross section, and of course it may have any form. It is sufficient to mount a member 10 having been formed in a spiral on the shaft sleeve 3, or to coil a string made of soft material having flexibility thereon. The width and the height of the spiral depend upon pitch and depth of a required spiral portion, and a spiral portion of high precision can be easily realized. The spiral direction in FIG. 3 has the left side within the machine and the right side facing the atmosphere, and if the sleeve has a spiral in the clockwise direction as seen from the left side, it will have a right screwing direction. If it has a spiral in the counterclockwise direction, it will have a left screwing direction.

FIG. 4 shows another embodiment of the shaft sleeve, in which the sleeve 3' is formed with a groove 11 on its outer circumference 3a', into which the spiral member 10 is positioned. By such a structure, the spiral member 10 can be more easily and exactly fixed. The groove 11 may be formed in spiral on the overall surface of the outer circumference of the sleeve or may be formed partially at determined places. FIG. 5 shows grooves 12 which are partially formed symmetrically spaced by 180° on the outer circumference, and herein the groove 12 is shaped in the form of the letter "X" so it can be used for both the right and left coiling directions. This shaft sleeve 3" can be also jointly used with the other rotary shaft sealing device as grand packing.

FIGS. 6 to 9 show embodiments applying the spiral shaped member to the rotary ring of the mechanical seal.

The mechanical seal defines a sliding surface sealed by means of the stationary ring 6' and the rotary ring 5' rotating together with the shaft 1'. As discussed, the rotary ring 5' is defined with the spiral portion 10 on its outer circumference to increase the urging pressure of the rotary ring 5' toward the stationary ring 6'. This was proposed in Japanese Utility Model Application No.40693/78 by the same applicants. This device was further developed in order to realize the mechanical seal for the atmosphere bearing powder gas and it was proposed in Japanese Utility Model Application No.160632/79 by the same applicants. In the embodiments shown in FIGS. 6 to 8, the spiral portion is the spiral shaped member 10. 7 is a spring, 8 is a stopper and 50, 60, 61, 80 are "O" rings. The rotary ring 5' is secured on its outer circumference 5a' with the spiral shaped member 10 at its both ends 101, 101 by welding, an adhesive agent or the like. Said securing may be effected not only at the both ends but also at a plurality of positions or over its entire length. In the embodiment shown in FIG. 6 the spiral 10 is circular in cross sectional area, but it may be any shape such as square and others. It is also good to mount a member 10 having been formed into a spiral on the rotary ring 5', or coil a string made of soft and flexible material on the rotary shaft. With respect to the screwing direction of the spiral member 10, if the shaft 1 has a spiral in the clockwise direction in FIG. 6, it will have a right screwing direction, and if it has a spiral in the counterclockwise direction, it will have a left screwing direction.

FIG. 8 shows another embodiment of the invention, in which the rotary ring 5" is defined on its outer circumference 5a" with a groove 11' into which the spiral member 10 is positioned. By such a structure, the member 10 can be more easily and exactly secured. The groove 11 may be formed spirally all over the outer circumference 5a" or partially at determined spacings. FIG. 9 shows that grooves 12 are partially formed symmetrically spaced by 180° on the outer circumference 5a" of rotary ring 5", and herein the grooves 12 are shaped as a letter "X" to meet both the right and left coiling directions.

In the above mentioned structure, the fluid is is caused to flow in the C direction during rotation of the machinery owing to the spiral shaped member 10, and the rotary ring 5" is added with pressure in the F direction, thereby to increase the sealing function and the slurry purging function.

FIGS. 10 and 12 show embodiments wherein a spiral shaped member is directed to the rotating shaft of a screw shaped rotating labyrinth seal or the stationary portion corresponding to the rotating portion.

The labyrinth seal is widely employed mainly to a non-contacting-type fluid seal, in which a thread is defined on the rotary shaft or on both of the rotary shaft and the casing, thereby to generate the sealing pressure at the pressure side for providing the sealing. The screw shaped rotating labyrinth seal is one embodiment of a labyrinth seal. There is a case of not threading casing side, and if the both are threaded, they are opposite each other.

In FIGS. 10 and 11, the spiral shaped members 10,10' are provided respectively on the outer circumference 1a of the shaft 1 and the inner circumference 2a of the casing 2. The spiral members 10,10' are circular in cross section in this embodiment, and may of course have any shape such as semi-circular, triangular, trapezoidal, rhombic or a diamond shape and others. FIG. 12 shows a spiral 100 having waves or zig-zag sides 102. The spiral member 10 (FIGS. 10 and 11) is fixed on the rotary shaft 1 by welding or an adhesive agent. For the spiral member 10, one which has been in advance formed in a spiral, may be mounted on the shaft 1 or the casing 2, or a string material of soft flexibility may be used. The embodiment shown in FIG. 10 includes a spiral member 10' on the casing, too, and the casing may be subjected to a conventional machining process for defining a groove for receiving the spiral or a flat face.

The screw shaped labyrinth seal has in general an inclination that the sealing pressure is made larger for a large pitch of the screw than for a small pitch, and the larger is the ratio of the screw depth, i.e., the heights (h1) and (h2) of the spiral members 10,10' and the space ($\epsilon$) of the rotating shaft 1 and the casing 2, the larger becomes the labyrinth effect. Accordingly, the higher are said heights, the larger is the sealing effect.

By the conventional machining process, it was difficult to make the depth of the screw large owing to a lowering of the strength of the shaft, the processing precision or the processing time. However, depending upon the above mentioned spiral member 10,10' the screws of any optional depth may be easily provided.

As mentioned, the spiral member 10,10' may be made of string-like material of flexibility or of a rigid material secured in a spiral form. FIGS. 13 to 15 show an embodiment of the string member to which the attention is paid with respect to easiness of attaching to the spiral forming portion and increasing of precision in the pitch.

The string member of FIGS. 13 to 15 comprised of a main body as a string 20, a spacer 21, an adhesive agent 22 and a film 24. The main body 20 is comprised of a material having flexibility. In view of the sealing device to be used, materials for main body 20 will be spring steel, stainless steel, bronze, plastic such as Teflon, nylon or the like, inorganic substances such as carbonaceous fiber, silicon-carbide fibers, or complex materials with plastics. The main body 20 in this embodiment is square in cross section, but may have circular, semi-circular, triangular, trapezoidal or other shapes. The main body 20 has a spacer 21 at its side. The spacer 21 in this embodiment has a square cross section, but is not limited to this shape. The thickness or the height of the main body 20 is determined by the height of a desired spiral. The spacer 21 is also comprised of the same flexible material as the main body 20. The spacer 21 is thinner in thickness than the main body 20, and is provided to form constant spaces on the fixing face 20a of the body 20 to the sealing device. The spacer 21 is detachably connected to the main body 20. FIG. 13 shows that the main body 20 is detachably connected to the outer circumference of the spacer 21 by means of a film coated 25 with an adhesive agent 23. FIG. 14 shows that the adhesive agent 23a is coated on the connecting faces of the main body 20 and the spacer 21 to provide a direct connection therebetween. The width of the spacer 21 is determined by the pitch of a required spiral. The main body 20 is prepared with the adhesive agent 22 on its fixing face 20a on which the film 24 is attached. The adhesive agent 22 may be a film or liquid.

Description will be made of forming a spiral with the string member in an embodiment of the screw shaped labyrinth seal. At the outset, the thickness of the main body 20 and the width of the spacer 21 are in advance made in correspondence to the required depth and pitch of a spiral. Subsequently, the film 24 is stripped to expose the adhesive agent 22, as shown in FIG. 15, and the surface with the adhesive agent 22 is fixedly coiled on the rotary shaft 1 without making spaces. Then, the film 25 is stripped and the spacer 21 is removed so that only the main body 20 is left and the spiral is formed. The depth of this spiral is determined by the thickness of the main body 20 and the pitch is determined by the width of the spacer 21.

It is also possible to provide temporary holding by the adhesive agent, and to fix the string member and the securing object by welding, after removing the spacer 21.

What is claimed is:

1. A sealing device for a rotary shaft means which rotates relative to a stationary member, comprising:
   a spiral-shaped sealing member separate from said rotary shaft means and said stationary member, said spiral-shaped sealing member having a predetermined pitch, a predetermined thickness and a predetermined height in the radial direction thereof; and
   means for fixedly mounting said separate spiral-shaped sealing member on a surface portion of a least one of a rotating portion of said rotary shaft means and a stationary portion of said stationary member which is adjacent to said rotating portion.

2. The sealing device of claim 1 further comprising a shaft sleeve mounted on an outer circumference of said rotary shaft means, said spiral-shaped sealing member being fixedly mounted on an outer circumferential portion of said shaft sleeve.

3. The sealing device of claim 2, wherein said shaft sleeve has a spiral-shaped groove defined on an outer circumferential portion thereof, said groove having a predetermined pitch and a predetermined depth which is substantially less than said predetermined radial height of said spiral-shaped sealing member, said spiral-shaped sealing member being fixedly mounted in said groove.

4. The sealing device of claim 3, wherein said spiral-shaped sealing member is partially defined with spiral-shaped grooves.

5. The sealing device of claim 2, wherein said shaft sleeve has grooves substantially in an "X" shape defined with a predetermined pitch and a predetermined depth on a predetermined position of the outer circumference thereof, and comprising spiral-shaped members of a predetermined height fixed in said grooves and extending in a selected direction in accordance with rotation of said rotary shaft means, said height of said spiral-shaped member being substantially greater than said depth of said grooves.

6. The sealing device of any one of claims 1, 2, 3, 4 or 5, wherein said spiral-shaped sealing member is a rigid member which is preformed in a spiral shape.

7. The sealing device of any one of claims 1, 2, 3, 4 or 5, wherein said spiral-shaped sealing member comprises a flexible string-like member mounted in spiral form on at least one of said rotary shaft means and said stationary member.

8. A mechanical seal for mounting on a rotary shaft and for liquid sealing against a stationary member, comprising:
   a shaft sleeve mounted on said rotary shaft; and
   a separate spiral-shaped sealing member having a predetermined pitch; a predetermined thickness and a predetermined height in the radial direction thereof, said spiral-shaped sealing member being fixedly mounted on an outer circumferential portion of said shaft sleeve facing said stationary member.

9. The mechanical seal of claim 8, wherein said shaft sleeve which carries said spiral shaped sealing member is mounted at a position corresponding to a neck bush.

10. A mechanical seal, comprising:
    a rotary ring facing a stationary member; and a separate spiral-shaped sealing member having a predetermined pitch, a predetermined thickness and a predetermined height in the radial direction thereof, said spiral-shaped sealing member being fixedly mounted on an outer circumferential portion of said rotary ring facing said stationary member.

11. The mechanical seal of claim 10, wherein said rotary ring has a spiral-shaped groove defined on an outer circumferential portion thereof, said groove having a predetermined pitch and a predetermined depth which is substantially less than said predetermined radial height of said spiral-shaped sealing member, said spiral shaped sealing member being fixedly mounted in said groove.

12. The mechanical seal of claim 11, wherein said spiral-shaped sealing member is partially defined with spiral-shaped grooves.

13. The mechanical seal of claim 10, wherein said rotary ring has grooves substantially in an "X" shape defined with a predetermined pitch and a predetermined depth on a predetermined position of the outer circumference of the rotary ring; and comprising spiral-shaped members of a predetermined height fixedly mounted in said grooves and being coiled on said rotary ring in a selected direction in accordance with rotation of said rotary ring, said height of said spiral-shaped member being substantially greater than said depth of said grooves.

14. The mechanical seal of any one of claims 8, 9, 10, 11, 12 or 13 wherein said spiral-shaped sealing member is a rigid member which is preformed in a spiral shape.

15. The mechanical seal of any one of claims 8, 9, 10, 11, 12 or 13, wherein said spiral-shaped sealing member comprises a flexible string-like member fixedly mounted in said spiral form on a predetermined position of said rotary ring.

16. A screw-shaped rotary labyrinth seal for use on a rotary shaft means located at a sealing area, comprising a separate spiral-shaped sealing member having a predetermined pitch, a predetermined thickness and a predetermined height in the radial direction thereof, said spiral-shaped sealing member being fixedly mounted on a surface of the rotary shaft means at said sealing area.

17. A screw-shaped rotary labyrinth seal for providing a liquid seal at a sealing area between a rotary member and another member comprising:
a first separate spiral-shaped sealing member having a predetermined pitch, a predetermined thickness, and a predetermined height in the radial direction thereof, said spiral-shaped sealing member being fixedly mounted on a surface of said rotary member at said sealing area; and
a second separate spiral-shaped sealing member having a predetermined pitch, a predetermined thickness, and a predetermined height in the radial direction thereof, said spiral-shaped sealing member being fixedly mounted on a surface of said other member facing said rotary member at said sealing area,
said second spiral-shaped member spiralling in a direction opposite to the spiral direction of said first spiral-shaped member.

18. A screw-shaped rotary labyrinth seal for providing a seal at a sealing area between a rotary shaft and another member, comprising:
a shaft sleeve adapted to be mounted on a rotary shaft; and
a separate spiral-shaped sealing member having a predetermined pitch, a predetermined thickness and a predetermined height in the radial direction thereof, said spiral-shaped sealing member being fixedly mounted on an outer circumferential portion of said sleeve at a position corresponding to a sealing position of said rotary shaft.

19. The screw-shaped rotary labyrinth seal of claim 18, further comprising a screw portion which comprises a second separate spiral-shaped sealing member having a predetermined pitch, a predetermined thickness and a predetermined height in the radial direction thereof, said spiral-shaped sealing member being fixedly mounted to said another member at said sealing area and facing said first separate spiral-shaped sealing member, and spiralling in a direction opposite to the spiral direction of said first spiral-shaped sealing member.

20. The screw-shaped rotary labyrinth seal of claim 16 or 18, wherein said spiral-shaped sealing member is a rigid member which is preformed in a spiral shape.

21. The screw-shaped rotary labyrinth seal of claim 17 or 19, wherein at least one of said spiral-shaped sealing members is a rigid member which is pre-formed in a spiral shape.

22. The screw-shaped rotary labyrinth seal of claim 16 or 18, wherein said spiral-shaped sealing member comprises a flexible string-like member fixedly mounted in said spiral form.

23. The screw-shaped rotary labyrinth seal of claim 17 or 19, wherein at least one of said spiral-shaped sealing members comprises a flexible string-like member fixedly mounted in said spiral form.

24. A string-like member for defining a spiral-shaped member of a sealing device to be disposed on at least one of a rotary shaft and a member facing said rotary shaft, comprising: a main body of string-like flexible material; a spacer detachably mounted at a side of said string-like material; and an adhesive agent fixedly securing said main body of said string-like material to at least one of said rotary shaft and facing member.

25. The string-like member of claim 24, wherein said spacer is detachably connected to said string-like material by means of said adhesive agent directly to the side of said string-like material.

26. The string-like member of claim 24, comprising a film member covering the outer surfaces of both said spacer and said string-like material for detachably connecting said string-like material to said spacer.

* * * * *

UNITED STATES PATENT AND TRADEMARK OFFICE
CERTIFICATE OF CORRECTION

PATENT NO. : 4,463,957
DATED      : August 7, 1984
INVENTOR(S): Yataro NAGAI et al It is certified that error appears in the above-identified patent and that said Letters Patent is hereby corrected as shown below:

Column 3, line 21, "101" should read --10'--;

Column 4, line 7, "member 10." should read --member 10,--;

Column 4, line 33, " 5a" " should read --5a'''-- and

5" should read -- 5'''--.

Signed and Sealed this

Fifth Day of March 1985

[SEAL]

Attest:

DONALD J. QUIGG

Attesting Officer    Acting Commissioner of Patents and Trademarks